Patented Dec. 9, 1947

2,432,353

UNITED STATES PATENT OFFICE 2,432,353

METHOD OF PRODUCING RETICULATED STRUCTURES

Joseph A. Talalay, New Haven, Conn.

No Drawing. Application September 11, 1946, Serial No. 696,365

6 Claims. (Cl. 260—723)

This invention relates to procedure for obtaining a cellular structure of rubber or the like and to the product obtained by such procedure, and especially to the coagulation or gelation of a foamed aqueous dispersion of rubber or the like.

Heretofore it has been proposed to effect irreversible coagulation of a specially compounded foam by the single step of cooling it to a temperature far below the freezing point, but when reduction of temperature is alone relied upon as the final step (proximate cause) of the coagulation it is necessary that (a) the foam be kept in the freezing bath for a long time or at an extremely low temperature, which is uneconomical and permits uneven deterioration of the foam by drainage; or (b) that a cold-sensitive stabilizer such as gelatine or silicic acid jelly be employed to lessen the drainage, which has the disadvantage that the stabilizer may undesirably modify the character of the final product; or (c) that a delayed-action coagulant such as sodium or potassium silicofluoride, calcium chloride, magnesium sulphate or zinc sulphate, be incorporated in the dispersion before it is frothed, which has the disadvantage that such coagulants do not produce the best of properties in the final product, and they also shorten the storage life of the compound.

The chief objects of my invention are to avoid disadvantages such as those above mentioned; to obtain a stereoreticulate product of small and uniform pore size; and to obtain a product in which the net-work is composed of a strong and firm or cohesive gel such as results from quick coagulation or from the use of a strong coagulant such as an alcohol or an acid, as contrasted with the less firm gels that are obtained by the use of delayed-action coagulants or by freezing alone.

In attaining these objects, I make use of the fact that in the freezing of the water in the foamed dispersion, without its being frozen to so low a temperature as to cause freezing alone to effect irreversible coagulation, the bubbles in the foam become intercommunicating, the foam thus becoming reticulate in all of the three dimensions or sterioreticulate.

I have found that with the foam in this condition it can be irreversibly coagulated, although frozen, by permeating it with a suitable liquid or gaseous coagulant.

Preferably the foam is cooled to the moderate freezing temperature quickly. The rapid drop in the temperature of the foamed dispersion is accompanied by a rapid increase in viscosity. This in turn arrests the detrimental natural "drainage" of foam with the concurrent weakening of the cell walls and the consequent fusion of smaller bubbles into larger ones (which is the mechanism by virtue of which foam degenerates on standing). Consequently much finer, more uniform and stronger foam-rubbers can be made by my method compared with foam-rubber made using delayed action chemical coagulants.

The time from the start to the completion of the coagulation is very short (and in some instances instantaneous). It is a recognized fact that better foam-rubbers are obtained when the time span of the sol-gel transformation is short.

Compared with prior methods more moderate temperatures and much shorter times can be used. As an example: neoprene latex Type 571 will irreversibly coagulate in a foam layer one-half inch thick at a temperature of —30° C. in about twenty minutes. Natural rubber latex, on the other hand, will not have irreversibly coagulated in a similar foam thickness until the temperature has been lowered to —50 or —60° C. and the time of exposure to cold extended to perhaps thirty minutes. This latter drawback can be counteracted by the addition of agents promoting the cold-gelation, but the addition of such substances as gelatine does not improve the properties of the foam-rubber.

When working in accordance with my method the water is the active part of the latex in the first step of formation of a "foam-ice." Foam-ice is formed regardless of the nature of the elastomer at any temperature below the freezing point of water, e. g., in 5–10 minutes at —20° C. or —25° C., and in a correspondingly longer time at say —10° C.

In order to carry out the subsequent operation of vulcanization successfully a strong and firm gel is required. The gel must be highly cohesive. A gel coagulated with a strong coagulant, such as an alcohol, or an acid, is much firmer than gels obtained by delayed action coagulants or by freezing alone.

The coagulation (gelation) of a latex with a delayed action coagulant takes place at a pH near the iso-electric point (pH 6.5 to 7.5, dependent on the nature of the elastomer latex). It has been the experience that the foam loses considerably in foam stability when the latex approaches the iso-electric point, and unless especially fortified and protected by soaps and viscosifying agents the foam tends to collapse just at the point when it is about to be gelled. This problem does not exist in my process, in which the foam is (to use a medical analogy) "anaesthetized" by the freezing of the occluded water while the gelling operation is performed.

For reasons which are not too well understood, frozen latex coagulates to a tough continuous film upon contact with strong coagulants, while liquid (not frozen) latex would curdle and flocculate under the same circumstances.

The conversion of the still reversible (re-meltable) "ice-foam" to the irreversible latex-gel-foam can according to my invention be effected in a few seconds or in a very few minutes by any of the following steps.

(1) The "ice-foam" is immersed into a bath of coagulating fluid, such as ethyl-alcohol, acetone, solution of calcium chloride or calcium nitrate in water, alcohol or acetone, aqueous solutions of coagulating electrolytes, acids, etc., and upon immersion into such a solution instantaneous coagulation occurs without any damage to the foam structure. Such solution or solutions may be pre-cooled below the melting point of ice.

(2) The "ice-foam" is exposed to an atmosphere of a coagulating gas, such as sulphur dioxide, carbon dioxide, nitric oxide, hydrochloric acid, etc., or to vapors of a coagulating liquid, examples being nitrogen or carbon dioxide saturated with alcohol vapor.

(3) If the "ice-foam" is confined in a mold or vessel a vacuum or partial vacuum can be pulled prior to the permeation with coagulating fluid or gas. This will result in a more rapid and more uniform permeation. If desired the coagulating fluid or gas can be made to circulate through the mold with the aid of an external propulsion element such as a pump, and can also be withdrawn by evacuation after they have accomplished the work of coagulating the ice-foam to an irreversible structure.

In one specific case of operating my invention the coagulation can be combined with the vulcanization by permeating the frozen structure with a mixture of sulphur dioxide and hydrogen sulphide. When catalyzed by the moisture present in the cell walls the two gases react, forming active sulphur, and produce vulcanization at low temperature simultaneously with the coagulation. The gases are preferably admitted simultaneously into a partially or fully evacuated mold, but they also can be used successively.

*Example.*—165 grams of natural rubber latex, centrifuged or creamed to a concentration of 60%, are stabilized with 5 grams of a 20% solution of potassium oleate soap, and are now compounded with a paste containing 5 g. of zinc oxide, 2 g. of sulphur, 1 to 2 g. of an antioxidant, and 1 g. zinc dibutyl dithio carbamate, the paste having been prepared in a pebble mill at 50% concentration, and stabilized with small amounts of ammonium caseinate and "Darvan."

To this compound are now added 10 c. c. of a 100-volume (30%) hydrogen peroxide, and while stirring rapidly are also added 2 c. c. of a 0.05% solution of the biochemical enzyme "catalase."

Before the mixture has substantially expanded it is poured into an aluminum mold of an internal volume of 1000 c. c. and permitted to expand therein to fill the mold.

The mold is now immersed into a bath of calcium chloride brine (maintained at −30° C.) for a period 5 minutes. At this point the water in the foam has frozen to ice, but the latex is still reversible. The pH of the brine bath has been adjusted to pH 10 by the addition of alkali.

The mold is now connected first to a vacuum pump and then to a supply of alkaline calcium chloride brine, which has been maintained at a temperature of −2° C. As the brine permeates the frozen structure irreversible coagulation takes place.

After about five minutes the mold is transferred into a steam vulcanizer where it is heated for about 25 minutes at 260° F. in live steam.

The vulcanized foam article is removed from the mold, washed, centrifugally extracted and dried.

The invention is applicable to aqueous dispersions of synthetic rubbers as well as natural rubber latex or artificial dispersions of natural rubber, and such dispersions are intended to be included in the expression "aqueous dispersion of rubber" in the appended claims, as are also aqueous dispersions of reclaimed rubber and of elastomers in general.

The preliminary formation of the foam can be effected by any of the known procedures, such as mechanical whipping or beating, chemical gas generation, or physical release of gas or vapor.

The foam may be produced in association with, or brought into association with, reinforcing fibers or other compounding materials.

I do not exclude from the scope of my invention the use of stabilizers or coagulants in conjunction with the steps recited in the claims.

I claim:

1. The method of making a stereoreticulate structure which comprises first producing and then irreversibly coagulating a foamed aqueous dispersion of rubber, the coagulation being effected by freezing the foam and thereby converting it into a stereoreticulate structure defining an intercommunicating system of flow channels and thereafter passing a coagulant, from its exterior, into the interstices of the frozen structure.

2. The method of making a stereoreticulate structure which comprises first producing and then irreversibly coagulating a foamed aqueous dispersion of rubber, the coagulation being effected by freezing the foam and thereby converting it into a stereoreticulate structure defining an intercommunicating system of flow channels and thereafter passing a coagulant, from its exterior, into the interstices of the frozen structure, the foam being cooled only to such moderately low temperature and for such moderate length of time as would not of itself cause irreversible coagulation of the foam.

3. The method of making a stereoreticulate structure which comprises first producing and then irreversibly coagulating a foamed aqueous dispersion of rubber, the coagulation being effected by freezing the foam and thereby converting it into a stereoreticulate structure defining an intercommunicating system of flow channels and thereafter passing a coagulant, from its exterior, into the interstices of the frozen structure, the method including the step of applying suction to the reticulated structure to withdraw fluid from its interstices.

4. The method of making a stereoreticulate structure which comprises first producing and then irreversibly coagulating a foamed aqueous dispersion of rubber, the coagulation being effected by freezing the foam and thereby converting it into a stereoreticulate structure defining an intercommunicating system of flow channels and thereafter passing a coagulant, from its exterior, into the interstices of the frozen structure, the foam being subjected to a relatively low temperature to freeze it quickly and then, before coagulation is completed, to a temperature that is higher than the first mentioned temperature but lower than the melting point of the foam.

5. The method of making a stereoreticulate structure which comprises first producing and then irreversibly coagulating a foamed aqueous dispersion of rubber, the coagulation being effected by freezing the foam and thereby converting it into a stereoreticulate structure defining an intercommunicating system of flow channels and thereafter passing a coagulant, from its exterior, into the interstices of the frozen structure, the foam being held to determinate external size and shape while thus treated, and the method including the step of effecting a permanent setting of the coagulated substance in that shape.

6. A method as defined in claim 1 in which reinforcing fibers are intermingled with the rubber prior to the coagulation of the foam.

JOSEPH A. TALALAY.

REFERENCES CITED

The following references are of record in the file of this patent:

UNITED STATES PATENTS

| Number | Name | Date |
|---|---|---|
| 1,156,134 | Schidrowitz et al. | Oct. 12, 1915 |
| 1,630,721 | Snelling | May 31, 1927 |
| 2,187,146 | Calcott et al. | Jan. 16, 1940 |
| 2,309,005 | Ogilby | Jan. 19, 1943 |